(12) United States Patent
Contarino, Jr.

(10) Patent No.: US 8,261,732 B2
(45) Date of Patent: Sep. 11, 2012

(54) COOKING GRILL

(75) Inventor: Alfred F. Contarino, Jr., Boxford, MA (US)

(73) Assignee: Season 4, LLC, Charlotte, NC (US)

( * ) Notice: Subject to any disclaimer, the term of this patent is extended or adjusted under 35 U.S.C. 154(b) by 164 days.

(21) Appl. No.: 12/697,685

(22) Filed: Feb. 1, 2010

(65) Prior Publication Data

US 2010/0132689 A1 Jun. 3, 2010

Related U.S. Application Data

(63) Continuation-in-part of application No. 11/866,691, filed on Oct. 3, 2007, now Pat. No. 7,905,225.

(60) Provisional application No. 61/160,423, filed on Mar. 16, 2009.

(51) Int. Cl.
*F24C 15/02* (2006.01)

(52) U.S. Cl. .................. 126/25 R; 126/41 R; 126/25 B; 126/41 D; 126/39 L; 126/38; 126/190; 126/39 K; 126/39 H; 126/378; 99/450; 99/443 R; 99/447; 99/396; 99/422

(58) Field of Classification Search .............. 126/25 R, 126/41 R, 38, 25 B, 190, 41 D, 39 L, 41 E, 126/39 K, 39 H, 378; 99/450, 443 R, 447, 99/396, 422, 446, 444
See application file for complete search history.

(56) References Cited

U.S. PATENT DOCUMENTS

| | | | |
|---|---|---|---|
| 833,529 A | 10/1906 | Jones | |
| 2,015,295 A | 9/1935 | Steingruber | |
| 2,127,146 A | 8/1938 | Smallen | |
| 2,709,996 A | 7/1954 | Tescula | |
| 2,940,381 A | 6/1960 | Cottongim et al. | |
| 3,152,242 A * | 10/1964 | De Mott | 392/416 |
| 3,199,438 A | 8/1965 | Myler et al. | |
| 3,443,510 A | 5/1969 | Norton | |
| 3,802,413 A | 4/1974 | Pepin | |
| 3,938,494 A * | 2/1976 | Clark | 126/41 R |
| 4,220,133 A | 9/1980 | Way, Jr. | |
| 4,598,634 A * | 7/1986 | Van Horn, II | 99/340 |
| 4,718,400 A | 1/1988 | Lotz et al. | |
| 4,800,865 A | 1/1989 | Setzer | |
| 5,237,914 A | 8/1993 | Carstensen | |
| 5,259,299 A | 11/1993 | Ferraro | |
| 5,347,978 A | 9/1994 | Zuran | |
| 5,355,868 A * | 10/1994 | Haen | 126/41 R |
| 5,368,009 A | 11/1994 | Jones | |
| 5,404,795 A * | 4/1995 | Coble | 99/339 |
| 5,553,601 A | 9/1996 | Parker et al. | |
| 5,911,812 A * | 6/1999 | Stanek et al. | 99/446 |
| 6,024,081 A | 2/2000 | Libertini, Jr. | |

(Continued)

FOREIGN PATENT DOCUMENTS

DE 3926182 A1 2/1991

*Primary Examiner* — Steven B McAllister
*Assistant Examiner* — Avinash Savani
(74) *Attorney, Agent, or Firm* — Tillman Wright, PLLC; Chad D. Tillman; Jeremy C. Doerre

(57) ABSTRACT

The invention is a cooking grill comprising a housing defining a cooking chamber and having a door therein hinged at a bottom thereof, a heating element disposed in the cooking chamber, a cooking surface slidably disposed to slide in and out of the housing through the door.

20 Claims, 10 Drawing Sheets

U.S. PATENT DOCUMENTS

| | | | |
|---|---|---|---|
| 6,029,649 A * | 2/2000 | Su | 126/200 |
| 6,114,665 A | 9/2000 | Garcia et al. | |
| 6,158,330 A | 12/2000 | Andress | |
| 6,260,478 B1 | 7/2001 | Harneit | |
| 6,892,722 B1 | 5/2005 | Francies, III et al. | |
| 7,163,011 B2 | 1/2007 | Pestrue | |
| 2002/0017290 A1 * | 2/2002 | Hines, Jr. | 126/41 R |
| 2006/0102015 A1 * | 5/2006 | Baker et al. | 99/450 |

* cited by examiner

COOKING GRILL

CROSS-REFERENCE TO RELATED APPLICATIONS

This application claims priority to provisional patent Application No. 61/160,423, filed Mar. 16, 2009 and is a continuation-in-part of application Ser. No. 11/866,691, filed Oct. 3, 2007, the disclosure of each of which is hereby incorporated herein by reference.

BACKGROUND OF THE INVENTION FIELD

The invention pertains to cooking grills.

BACKGROUND

Cooking grills are extremely popular in the United States and elsewhere for outdoor cooking during the warm months of the year. However, they also are often used indoors and/or during the colder months of the year.

A conventional cooking grill comprises at least a cooking chamber, a grilling surface disposed in the cooking chamber, and one or more heating elements, such as a flame manifold and/or an infrared heater, proximate (typically beneath) the grilling surface within the cooking chamber. The cooking chamber is commonly provided by a metal housing comprising two parts configured in a generally clamshell type arrangement, within which the heating elements and grilling surface are disposed. Typically, the top half of the housing is hingedly connected to the bottom half of the housing so that the top half of the housing can be tilted up relative to the bottom half in order to provide the user access to the cooking chamber. Particularly, the user must have access to the grilling surface in order to place food on the grilling surface, remove food from the grilling surface, and generally observe the food to determine when it is done cooking. The heating elements are coupled to a fuel source (e.g., a self-contained source such as a propane tank mounted to a base of the cooking grill) in order to create the heat for cooking.

The grilling surface usually is disposed above and close to the heating elements inside the cooking chamber. It usually comprises a grating positioned above the flame manifolds made of metal, porcelain, or another material that can retain heat from the flames and release that heat to food placed in contact with the grilling surface in order to sear the food where it contacts the grill grating. The grating provides a surface on which food to be cooked can be supported, but which has openings therethrough so that the food placed on the grill is directly exposed to the flame and/or heat from the heating elements through the openings or spacings in the grating.

Grills of the prior art suffer from many drawbacks. For instance, the cooking of the food in a cooking grill is the result of two separate phenomena. First, the bottom side of the food that is in contact with the grilling surface is heated directly by the flame and/or contact with the surface of the grating. However, the entire piece of food is also heated and cooked by means of convection by the heat that builds up inside the cooking chamber as a result of the flames. However, every time the user opens the top of the cooking chamber, as is frequently necessary to insert, remove, or observe the food being cooked, all of the heat that has built up inside the cooking chamber that cooks the food by convection escapes and cooking by convection essentially halts. When the grill cover is closed again, then the heat can build up again over a certain number of minutes and cooking by convection again commences. Thus, opening the top of the cooking chamber slows down the overall cooking process and wastes fuel. It also ultimately tends to lead to drier food when it is finally cooked.

Another drawback of conventional cooking grills is that, typically, only one type of cooking, namely, grilling, can be performed. For instance, one cannot fry food in a conventional grill because there is no solid continuous surface on which the food can cook, only the grilling surface, which has openings in it. Also, there is no convenient location in a conventional grill to place water for steaming food.

Yet another drawback of conventional cooking grills is that drippings from the food that is cooked on the grilling surface fall through the openings in the grilling surface onto the flame manifolds and/or the bottom of the cooking chamber. While some buildup of the drippings onto a surface above the flame manifolds is desirable since it adds flavor to the cooking, most of the drippings will fall onto the flame manifolds themselves and/or to the bottom surface of the cooking chamber. This is undesirable because the food drippings tend to cause the flame manifolds or bottom surface of the housing to corrode over time. Hence, the bottom of most cooking grills are sloped toward one central location so that the drippings will flow to a single location in the bottom surface of the housing where they can exit the cooking chamber through a hole and into a container disposed beneath the hole. The user can occasionally remove the container, empty its contents, and replace it beneath the hole. This process is performed relatively infrequently and thus is easy to forget to perform. If the user forgets to empty the container and the container overflows, it may damage the deck or other surface on which the cooking grill is placed. Furthermore, as noted above, the container is positioned beneath the bottom of the cooking chamber and, therefore, typically is difficult to access.

SUMMARY OF THE INVENTION

The invention pertains to cooking grills comprising a housing defining a cooking chamber and a door hinged at a bottom thereof, a heating element disposed in the cooking chamber, a cooking surface slidably disposed to slide in and out of the housing through the door.

DETAILED DESCRIPTION OF THE INVENTION

Figure 1:
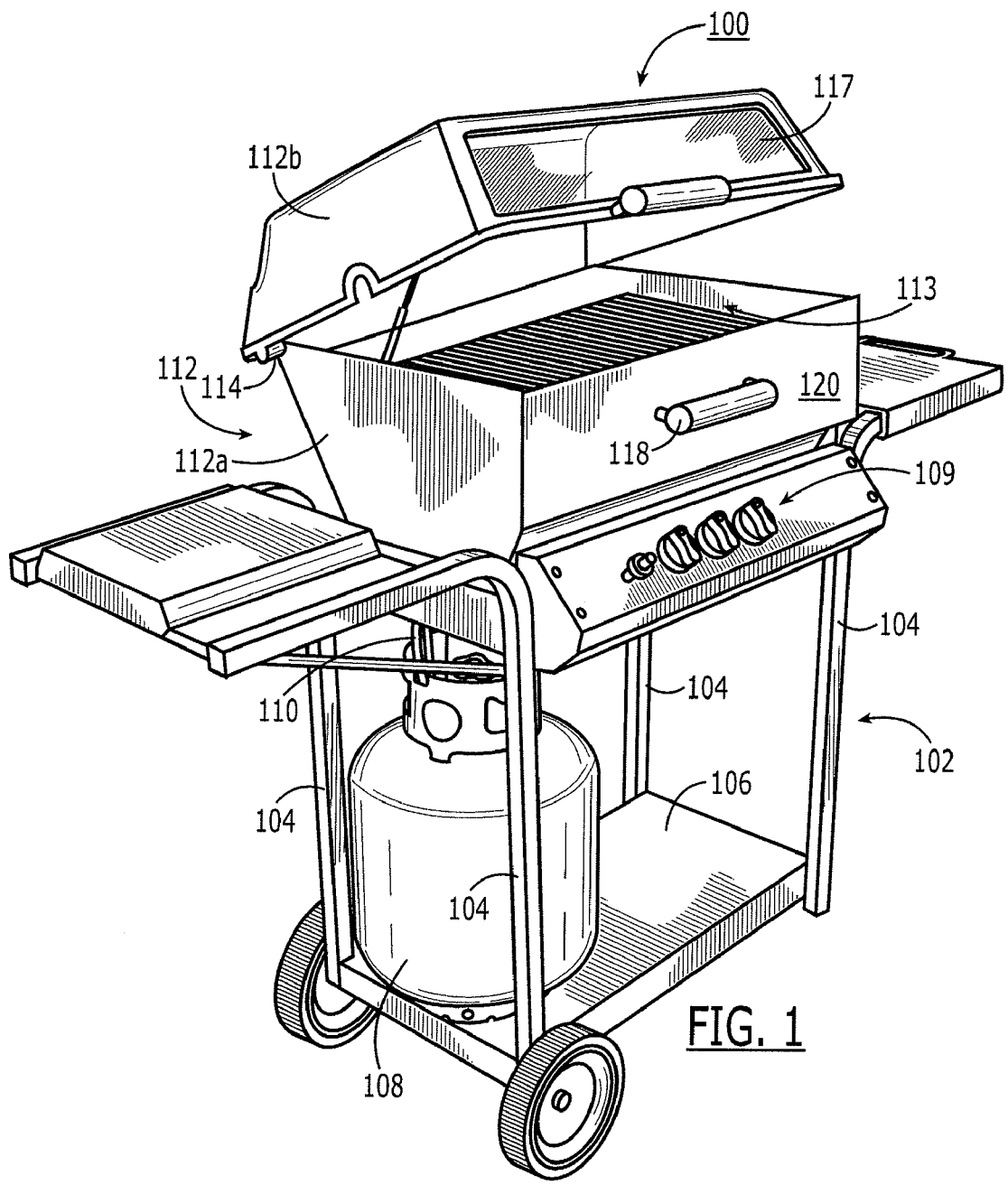
FIG. 1 is a perspective view of a cooking grill in accordance with a first embodiment of the present invention with the top shown in a partially open position.
Figure 2:
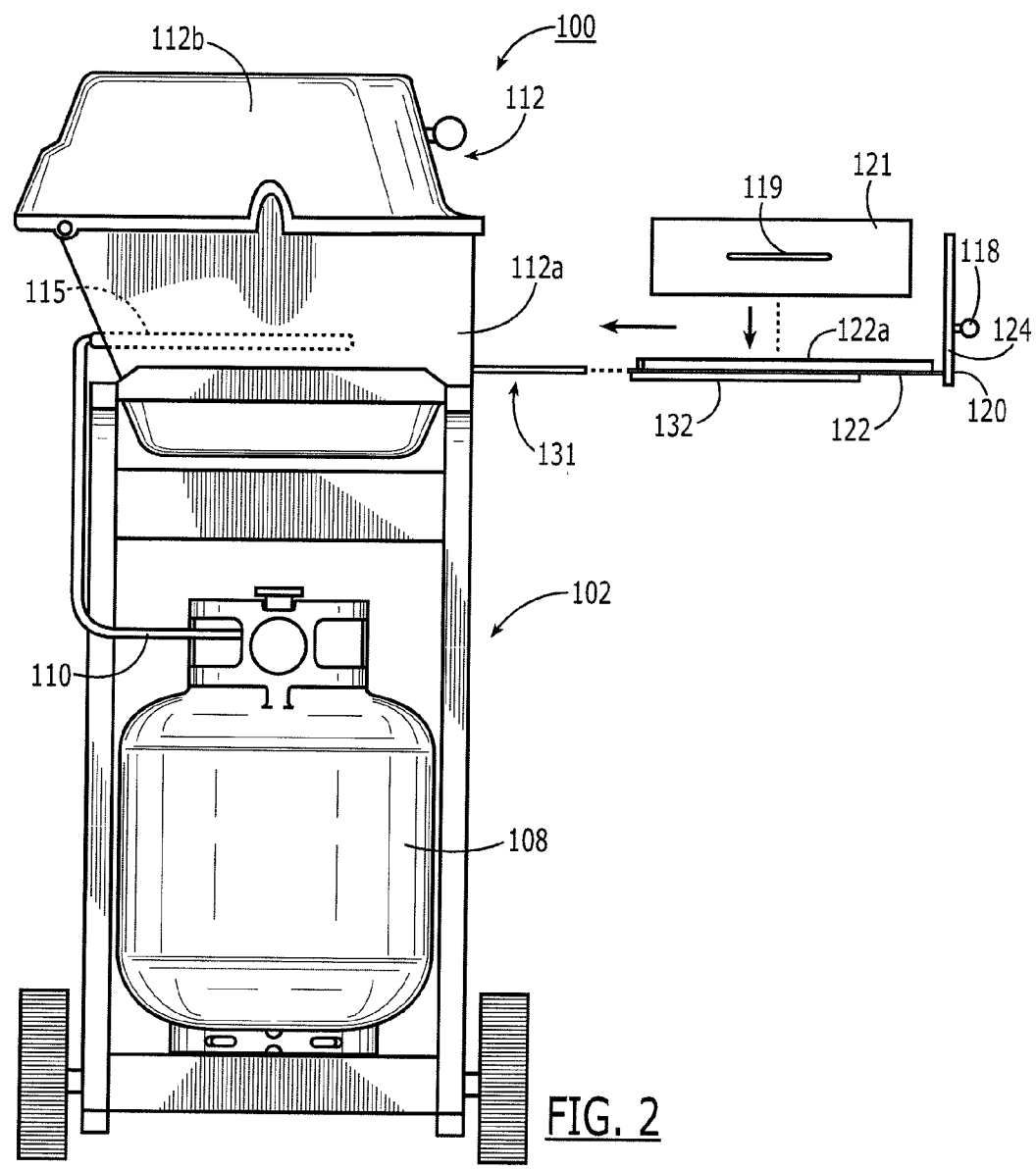
FIG. 2 is an exploded side view of the cooking grill of FIG. 1.

FIG. 1 is a perspective view of a grill in accordance with one particular embodiment of the present invention with the top of the grill partially opened for illustrative purposes. It should be understood that the grill would not normally be used with the top partially open, but with the top either fully open or fully closed. FIG. 2 is a partially-exploded, side view of the grill of FIG. 1 with the top closed and the side drawer open.

The grill 100 comprises a base or stand portion 102 comprising a plurality of legs 104 for supporting it on the ground or other horizontal surface and a shelf 106 for storage of items such as cooking supplies, cooking utensils, etc. The base 102 may be open, enclosed on one or more sides, or enclosed on all sides. If enclosed on all sides, preferably one of the sides includes or comprises a door for permitting access to the shelf or storage space. A fuel source, typically self-contained, such as a propane tank 108, is mounted somewhere on the base 102. However, in other embodiments, the grill 100 also can be connected to a permanent source of fuel, such as a household natural gas line. A fuel hose 110 typically extends from the fuel source 108 to one or more heating elements, such as flame manifolds 115 (not shown in FIG. 1, but shown in phantom in FIG. 2 and in full in FIG. 5). The flame manifolds 115 are disposed inside of a cooking chamber 113 defined by a housing 112. Housing 112 completely encloses a volume 113 including the flame manifolds 115 and within which the cooking occurs. The housing 112 comprises a bottom housing portion 112a and a top housing portion 112b connected to each other by a hinge 114 at the back of the housing 112. Preferably, a viewing window 117 made of high temperature glass is disposed in the top housing portion 112b. A first handle is disposed on the front of the top housing portion 112b so that a person may grasp the first handle and tilt the top half up about the hinge 114 in order to gain access to the cooking chamber 113 from above.

In other embodiments, the fuel source may be wood, coal or any other combustible material contained entirely contained within the housing.

The grill also is equipped with controls 109 for operating the grill, such as a spark igniter and rotary knobs for controlling the rate of gas flow to the flame manifolds to control the temperature in the cooking chamber 113.

In the grill of FIG. 1, three flame manifolds run in the direction of front-to-back of the housing. However, this is merely exemplary, as the number of flame manifolds may be more or less than three and the flame manifolds alternately may run side-to-side. Furthermore, while the controls 109 are shown in front of the housing, they may be placed anywhere, such as on the side of the housing. Placement on the side of the housing may be more practical for embodiments in which the flame manifolds run side-to-side, rather than front-to-back within the housing. Specifically, cooking grills commonly have a separate control knob that controls a valve individually that controls the gas flow to each manifold. The valve usually is directly below the knob and attached to the knob by a direct mechanical linkage. Accordingly, it is usually most practical, although certainly not required, to position the valve and corresponding control knob at one end of the corresponding manifold.

In accordance with the present invention, the grill 100 includes a second means for gaining access to the cooking chamber. Particularly, disposed in the main body 112a of the housing is a sliding drawer 120 that holds a grilling module 121, as seen in FIGS. 1 and 2 and shown in more detail in FIGS. 3 and 4. The drawer can slide horizontally outwardly from the housing 112. The drawer comprises at least a bottom tray 122 and a front wall 124. A second handle 118 is disposed on the external side of the front wall 124 of the drawer 120. This drawer is mounted on the main housing portion 112a via slides, rollers, or any other mechanism typically used for mounting a drawer to a main body so that the drawer can be slid open and closed easily. Furthermore, the drawer is completely removable from the housing 112 via any reasonable means. FIG. 2 is a side, exploded view of the grill housing 112, drawer 120, and grilling module 121, illustrating an embodiment in which the drawer is mounted to the housing by mating high-temperature slides 131, 132 on the bottom of the housing 112a and bottom of the drawer 120, respectively. Preferably, the drawer mounting mechanism is any one of several widely available drawer mounting mechanisms that includes some type of safety mechanism that requires the drawer to be maneuvered in a particular manner relative to the housing in order for it to become completely disengaged from the housing. This will prevent the drawer from accidentally falling out merely by pulling it too far out of the housing.

The grilling module 121 sits freely on the drawer 120. Preferably, the bottom surface 122 of the drawer includes a peripheral lip 122a all the way around the surface 122 inside of which the grilling module 121 is retained laterally so that the drawer cannot accidentally slide off of the drawer. Thus, the grilling module 121 must be lifted above the lip 122a to be removed from the drawer. Also, the front wall 124 preferably is solid so that, when the drawer is closed, the front wall 124 is coplanar with the front surface of the housing 112 so as to substantially seal the housing 112 to keep the heat therein.

Figure 3:
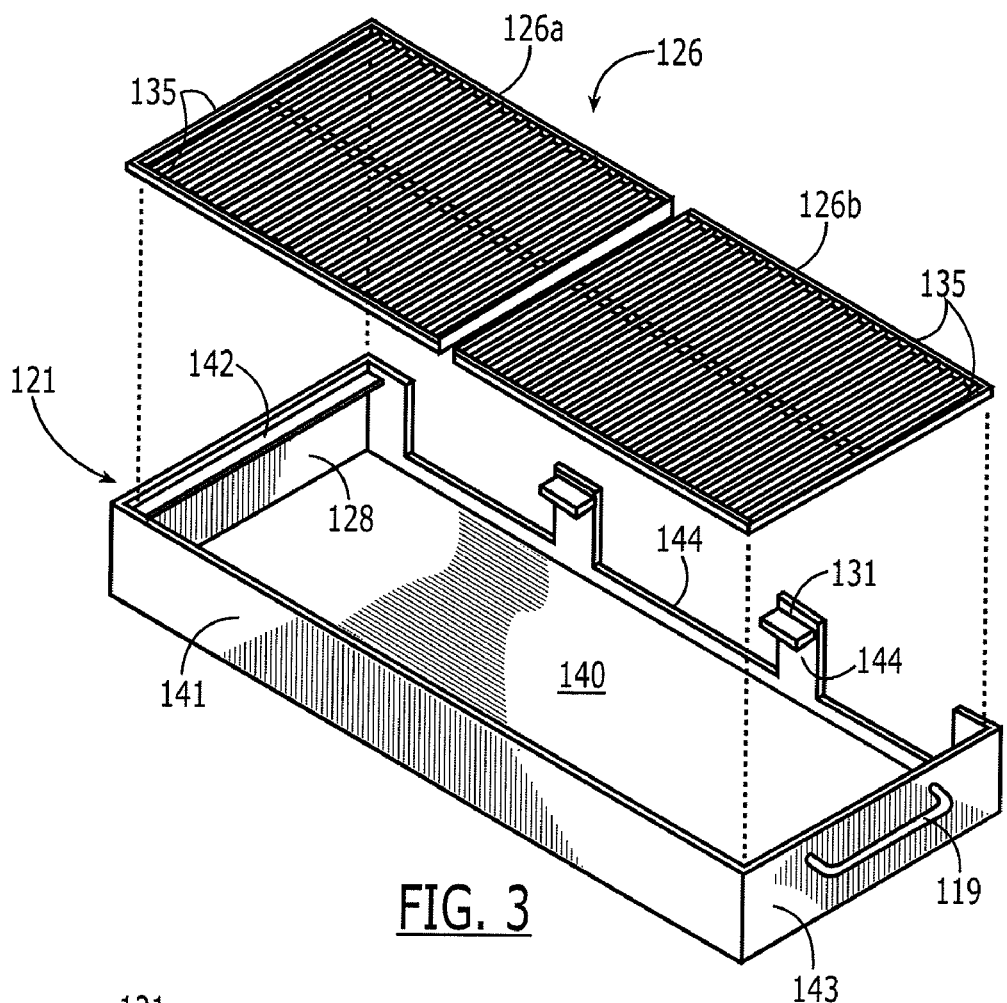
FIG. 3 is an exploded perspective view of the drawer.
Figure 4:
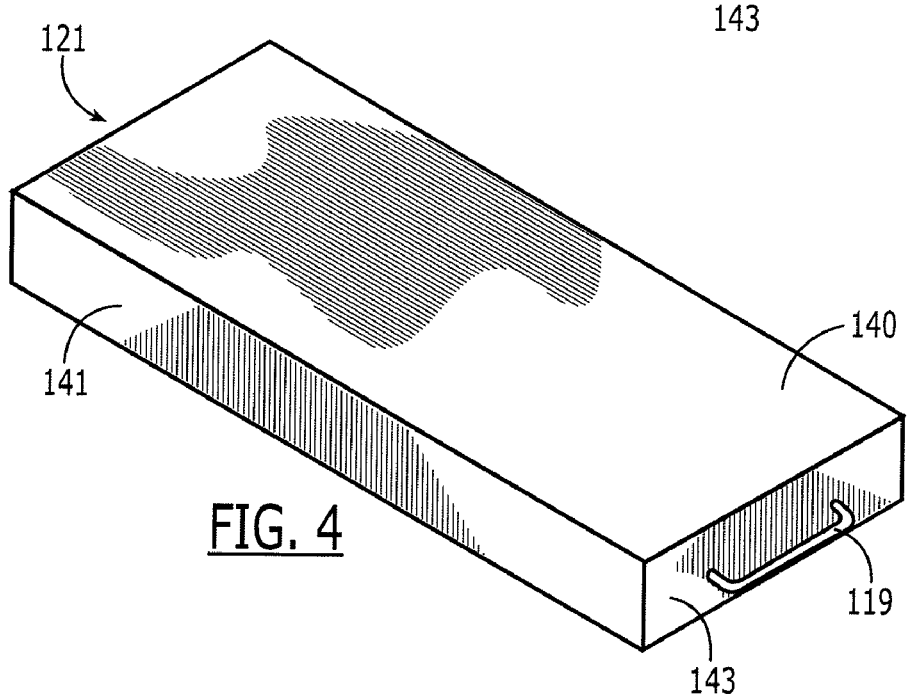
FIG. 4 is a perspective view of the drawer in the flipped position in which the frying surface is on top.
Figure 5:
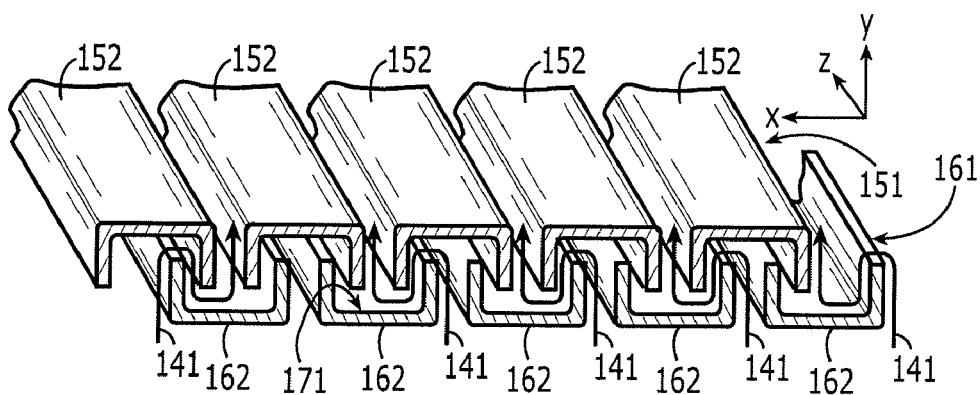
FIG. 5 is a cross-sectional view of a segment of a first embodiment of a grilling surface.

The grilling module 121 is best seen in FIGS. 3-5 and comprises a generally rectangular box with no top. Particularly, it includes a solid bottom surface 140, a solid front wall 141, two solid side walls 142, 143, and a segmented rear wall 144.

In an alternate embodiment, the drawer may not have a front wall 124, but instead the front wall 144 of the grilling module 121 forms the front surface that closes the drawer opening in the housing 112. The rear wall 144 is segmented to provide openings through which the flame manifolds 115 extend so that the flame manifolds will not interfere with the sliding of the drawer 120 (with the grilling module 121 mounted therein) in and out of the housing 112.

The front wall 141, side walls 142, 143, and segmented rear wall 144 are provided with, shaped, or bent so as to collectively define a shoulder 131 substantially around the grilling module 121 on which the peripheral edge 135 of a cooking surface (e.g., a grill) 126 can rest so as to suspend the cooking surface 126 in the grilling module 121 above and generally parallel to the bottom surface 140. The cooking surface 126 is vertically spaced from the bottom surface 140 a distance that permits the flame manifolds 115 to be positioned vertically between the cooking surface 126 and the bottom surface 140 of the grilling module 121 when the drawer 120 is closed.

The terms vertical and horizontal as used herein are not intended to imply a specific orientation relative to the earth, but are used relative to each other and for convenience of language and understanding to describe the grill components as they would be oriented when the grill is being used in a conventional orientation, such as standing upright on level ground.

In the embodiment shown in FIG. 3, for instance, the cooking surface 126 comprises two identical pieces 126a, 126b, as is conventional. However, the cooking surface may also comprise a single, unitary piece or two or more non-identical pieces.

In a preferred embodiment, the grilling module 121 and/or cooking surface 126 is equipped with one or more mechanisms to help retain the cooking surface 126 in the grilling module 121 so that it requires a small amount of force to detach the cooking surface from the grilling module. This mechanism may comprise spring clips on the cooking surface that sandwich one or more of the walls 141, 142, 143, 144 of the grilling module between two resilient legs of the clip. However, any other reasonable mechanism can be employed, including tabs formed on the peripheral edge of the cooking surface or adjacent the shoulder 131 in the grilling module so as to form a low-force friction fit or interference fit between the grilling module 121 and the cooking surface 126.

When the drawer is closed, the bottom surface 140 of the grilling module 121 is positioned beneath the flame manifolds 115 while the cooking surface 126 is positioned above the flame manifolds. Hence, the bottom surface 140 serves as a drip pan for the drippings that fall through the cooking surface 126 when food is being cooked.

The drawer can be slid out to permit the user to remove the grilling module 121 and carry it away from the grill 100, such as to a refrigerator or kitchen counter prior to cooking to place the food on the grilling module 126, rather than bringing the food to the cooking grill on a separate tray or plate. The user can insert the loaded grilling module 121 into the drawer 121 and close the drawer to commence cooking.

The user can pull out the drawer without opening the top of the grill while the food is cooking in the cooking grill to add food to the grilling module, remove food from the grilling module, or simply view the food to see how it is cooking without the need to open the top 112b of the housing 112 and thereby let all of the heat out of the cooking chamber. Only the small side opening 133 of the cooking chamber is opened when the drawer is slid out to the open position. Much less heat will escape from the cooking chamber for two reasons. First, the side opening is a much smaller opening than the opening created when the top of the housing 112b is tilted upwardly on the hinge 114. Second, the opening is a side opening rather than a top opening. Heat tends to rise. The heat will escape much more slowly through a side opening than through a top opening of equivalent size.

Thus, most of the heat will remain inside the cooking chamber when the drawer 120 is slid open. This is preferable to tilting the top half 112b of the housing open, whereby all of the heat in the cooking chamber will immediately rise up and out of the cooking chamber, essentially halting cooking by convection.

However, the present design also provides a tiltable top housing portion 112b so that the user still has the option of opening the top, if so desired. For instance, the user may wish to rapidly dissipate heat if the food is cooking too quickly.

Since, the grilling module 121 includes its own bottom surface 140, the drawer can be opened to expose the food without the risk of drippings falling on the ground or surface beneath the grill since the bottom surface 140 will remain beneath the grilling surface 126 and will continue to catch any drippings even while the drawer is open.

In an alternate embodiment of the invention, the grilling module and drawer may be integrally formed as one unit.

Other advantages of this configuration include faster cooking and reduced fuel consumption because much less heat is dissipated when the drawer is opened and less dried-out food because the food cooks more quickly.

Further, because the grilling module and/or drawer is removably coupled to the housing, it can be completely removed from the grill for cleaning. Furthermore, because the cooking surface 126 is removably mounted to the grilling module 121, it can be easily removed for cleaning. Furthermore, the bottom surface 140 of the grilling module has a lip for retaining liquid. This feature helps keep drippings from falling out of the grilling module.

Furthermore, the lip allows the bottom of the grilling module 121 to retain a layer of water, which may be heated by the flame when the drawer is closed so that the cooking grill may alternately be used as a steamer, if desired, as well as a conventional grill. The fact that the top 112a of the grill housing need not be opened to access the grilling surface allows the water to be heated quickly above boiling temperature and to remain at or above boiling temperature to generate the steam for steaming vegetables or other food on the grilling surface immediately above the boiling water.

Also in accordance with a particular embodiment of the invention, the grilling module 121 (or entire drawer in the aforementioned unitary embodiment) can be flipped over as illustrated in FIG. 4 and inserted into the cooking chamber upside down so that the bottom surface 140 of the grilling module is on top of the flame manifolds 115. The outer surface 140a of 140 can then be used as a frying or griddling surface in the cooking grill 100 for cooking fish, pancakes or other foods that cannot be cooked on a grated surface. In one embodiment, at least the outer surface 140a is coated with Teflon or another non-stick surfacing to provide a better, non-stick cooking surface for frying. In this embodiment, the cooking surface 126 may be removed from a drawer since it is not used in this configuration. However, in other embodiments in which the cooking surface might be non-removable from the grilling module (or drawer), the cooking surface can remain and will not interfere with the use of the cooking grill as a fryer in this configuration.

In one particularly useful embodiment, the grilling module 126 and/or drawer 121 includes folding side handles 119 to facilitate carrying of the grilling module in a balanced manner and without getting one's hands dirty.

In yet another embodiment of the invention, the grill is sold with (or the buyer can separately purchase) multiple cooking surfaces such as cooking surface 126. This allows the user to prepare several cooking surfaces with food before cooking and then simply exchange cooking surfaces when the food on one cooking surface 126 is cooked. The multiple cooking surfaces may have different configurations. For instance, the different surfaces may include a conventional grated grilling surface, a corrugated solid grilling surface, and a solid, non-stick frying or griddling surface for cooking foods like pancakes and flaky fish that would fall through a conventional grated grilling surface.

Also, if each cooking surface comprises two or more pieces, as illustrated in FIG. 3, then two different types of cooking surfaces can be used simultaneously so that the user can perform two different types of cooking simultaneously, for instance, frying on half of the cooking surface and grilling on the other half.

In a further embodiment of the invention, the drawer can be equipped with steps or another mechanism that permits adjustment of the height of the grilling module in the drawer so as to change the distance between the flame manifolds 115 and the cooking surface 126 to accommodate different types of cooking styles. For instance, for steaming, the grilling module 121 may be placed at a higher setting so that the flame manifolds 115 are close to the bottom 140 of the module closer to the water. For grilling, especially foods that should be cooked quickly, the grilling module 121 can be placed at a lower position in the drawer so that the flame manifolds 115 are closer to the cooking surface 126.

FIG. 5 illustrates a novel grilling surface that can be one of the interchangeable cooking surfaces. FIG. 5 is a close-up perspective view of a portion of a cooking surface in accordance with one particular embodiment of the invention. As can be seen, the grilling module comprises two, preferably, generally parallel, generally planar sets of grates 151, 161 vertically spaced from each other. Each grate is comprised of a plurality of generally parallel longitudinal members 152, 162, respectively. The two grates 151, 161 are joined at their edges to provide a unitary structure and, for each grate, the longitudinal members 152 or 162 may be joined together by transverse joining members 171 in order to provide sufficient strength to the overall structure. All of the components may be joined by welding or other attachment techniques. Alternately, the cooking surface may be cast or molded as a unit or as a few pieces that are then joined by welding or other techniques.

The two parallel grates 151, 161 are offset vertically (the y dimension in FIG. 5) from each other by a small amount, e.g., anywhere from about the thickness of the longitudinal members to about four times the thickness of longitudinal members. However, any other vertical spacing would be acceptable also. Furthermore, the longitudinal members 152, 162 of the first and second grates 151, 161 are transversely offset from each other in the transverse direction (the x dimension in FIG. 5) so as to form two offset rows of longitudinal members, one above the other, wherein the longitudinal members overlap partially with each other when viewed from directly vertically above. See, for instance, overlap distance b in FIG. 5.

In one embodiment, the members 152 of the top grate have upper surfaces configured to allow food drippings or other matter falling thereon to fall or slide off without becoming trapped thereon and the members 162 of the bottom grate have upper surfaces comprising a channel or other shape that will trap food drippings or other matter falling from above. In one particular embodiment, the longitudinal members of both gratings 151 and 161 have the same cross sectional shape, namely a U- or V-type shape or any other shape that has a channel on one side, including the illustrated shape of FIG. 5. However, the top set of longitudinal members 152 are upside down relative to the bottom set of longitudinal members 162 (i.e., rotated 180° about their longitudinal axes relative to each other). Hence, the upper longitudinal members 152 are upside down Us so the channels face downwardly and the bottom set of longitudinal members 162 are right side up Us so that the channel faces upwardly. In this manner, drippings from the food fall off the edges of the upper surface of the top set of longitudinal members 152. Due to the aforedescribed overlap of the top and bottom longitudinal members, these dripping will fall down from the edges of the top longitudinal members 152 onto the bottom set of longitudinal members 162. However, since the bottom set of longitudinal members 162 are oriented with the channels facing up, the drippings will fall into the channels 171 and substantially remain therein.

Thus, drippings from the food will generally slide down off of the longitudinal members 152 of the top grating 151 into the channels 171 in the longitudinal members 162 of the bottom grating 161, where they will remain.

This presents an ideal grilling situation since, as noted above, having the food drippings remain in the grill above the flames is desirable because the drippings volatilize when heated and add flavor to the food being cooked above it. However, the food does not come in contact with these drippings, which would be undesirable.

The longitudinal members of at least the top grating may be oriented slightly askew from perfectly horizontal (i.e., perfectly in the x, z, plane in FIG. 5) in order to facilitate the flow of drippings off of the top grating 151. This may be achieved by constructing the cooking surface with the longitudinal members (either both sets or just the top set) slightly tilted about either the z axis or the x axis. Alternately, the entire grilling module 121 may be mountable in the drawer at a slight angle from the horizontal about either the z or x axes.

This cooking surface keeps the drippings from falling onto the flame manifolds and the entire grilling module 121 keeps the drippings from falling to the bottom of the housing 112, which saves the manifolds and the housing from corroding. When the drippings become excessive, the grilling module and/or the cooking surface can be easily removed for cleaning. In another embodiment of the invention, the top and bottom gratings may be removably coupled to each other to even better facilitate cleaning of the longitudinal members of the bottom grating 161 by removing the top grating 151.

Furthermore, the grilling module still provides an open grating so that the flames and the heat have an unobstructed path through open space from the flame manifolds to the food, as illustrated by wavy arrows 141 in FIG. 5.

Figure 6:
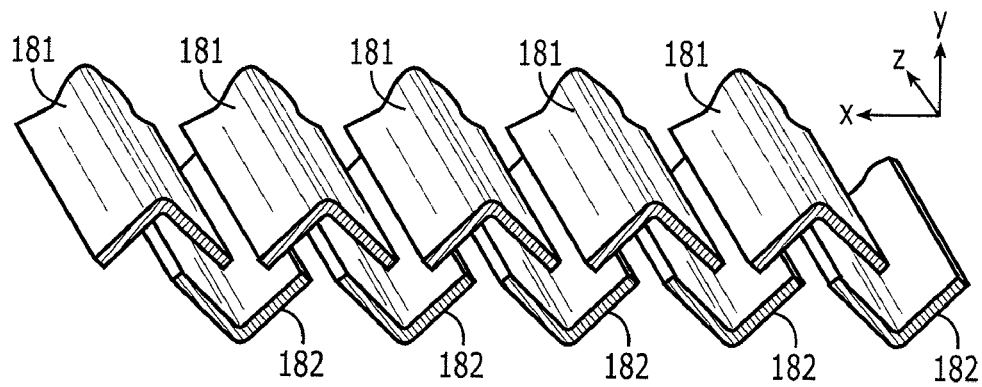
FIG. 6 is a cross-sectional view of a segment of a second embodiment of a grilling module.

FIG. 6 illustrates a V-shaped embodiment of the longitudinal members 181, 182 of the cooking surface. One advantage of this particular embodiment is that the top set of longitudinal members 181 have an apex 182 in the middle from which the surface of the member 181 slopes downwardly in both directions. Therefore, drippings will more readily slide down from the top set of longitudinal members 181 into the channels 183 in the lower set of longitudinal members 182.

Figure 7:
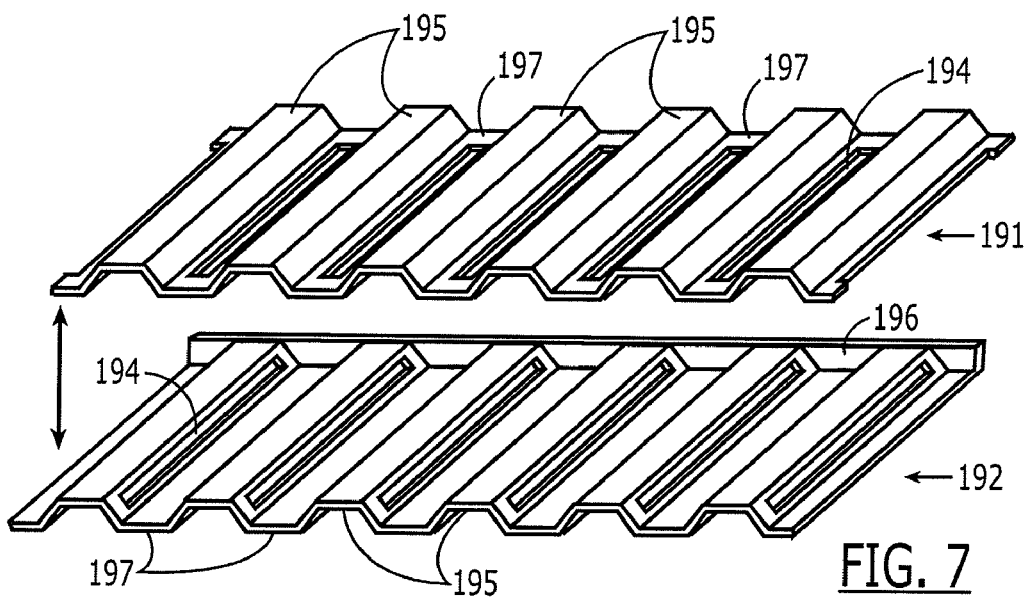
FIG. 7 is a cross-sectional view of a segment of a third embodiment of a grilling module.

FIG. 7 is an exploded view of yet another embodiment of a fat removal cooking surface 190. In this embodiment, the cooking surface comprises two parallel closely spaced corrugated sheet surfaces 191, 192 defining a series of troughs (or channels) 197 and peaks 195. The corrugations may be U-shaped, V-shaped, square channel-shaped, parallelogram channel shaped (illustrated in FIG. 7), or any other reasonable shape. Longitudinal slots 194 are cut into the corrugated sheets 191, 192 to allow the flames and heat to more readily reach the food. Also, the slots in the top corrugated sheet allow the drippings to fall through the top corrugated sheet 191 into the troughs or channels 197 in the bottom corrugated sheet 192.

In at least the bottom corrugated sheet 192, the slots 194 should be positioned slightly above the bottom of the channel 197 so that the channel can trap the drippings without the drippings falling through the slots 194 in the bottom corrugated sheet. In the top corrugated sheet, the slots 194 may be formed in the same position to minimize manufacturing cost. Alternately, however, the slots 194 in the top sheet can be formed in the bottom of the troughs 197 to better facilitate the flow of drippings through the top sheet. The two sheets may be welded or joined together by any other reasonable means.

The embodiment of FIG. 7 is advantageous in that it is very inexpensive to manufacture since it essentially comprises two corrugated sheets with slots formed therein and joined together at their edges.

With respect to the fat removal cooking surfaces, it may be desirable to provide longitudinal end walls, such as wall 196 illustrated in FIG. 7 at the longitudinal ends of at least the bottom corrugated sheet (or bottom set of longitudinal members) in order to better retain more drippings without the drippings running out of the longitudinal ends of the longitudinal members (or corrugated sheet).

Figure 8:
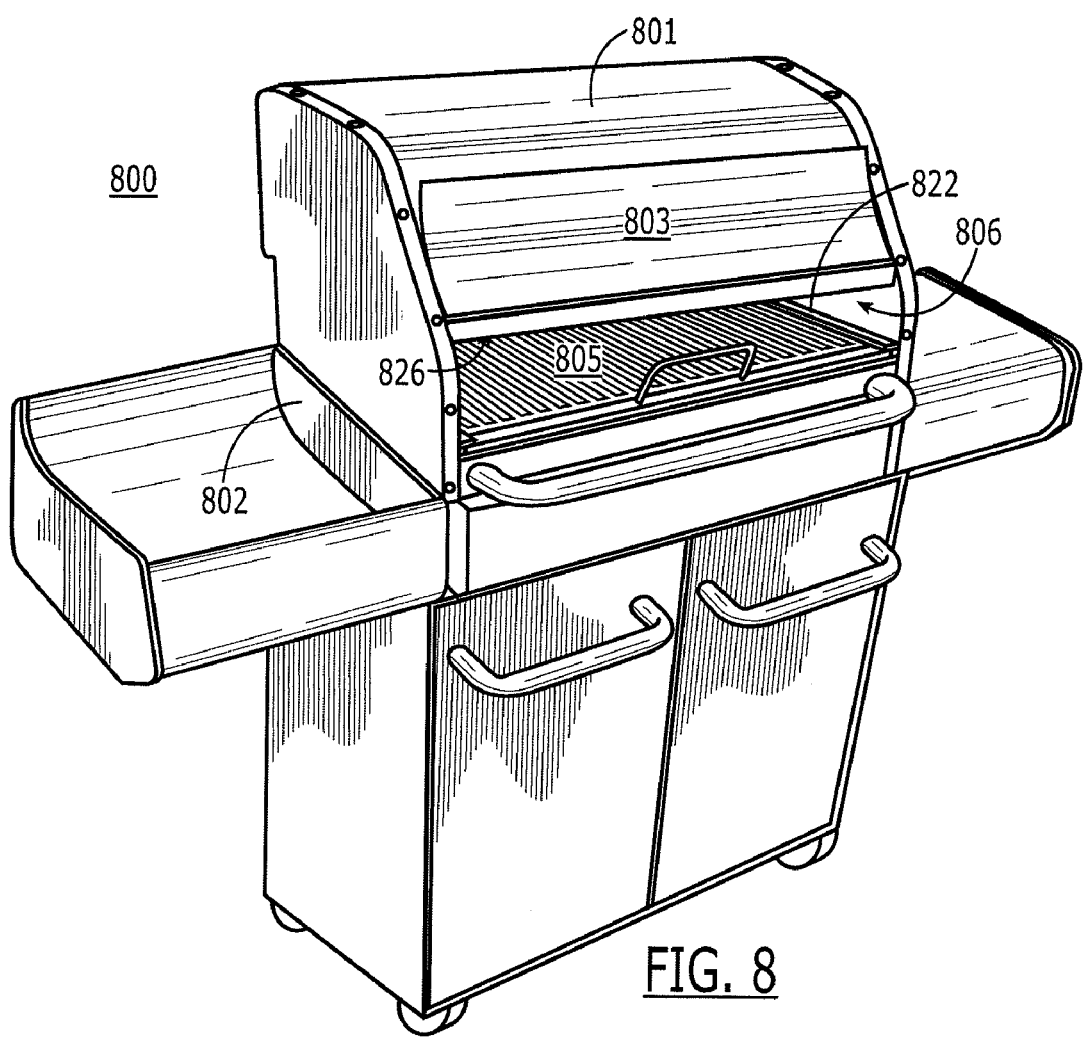
FIG. 8 is a perspective view of a cooking grill in accordance with another embodiment with the door open.
Figure 9:
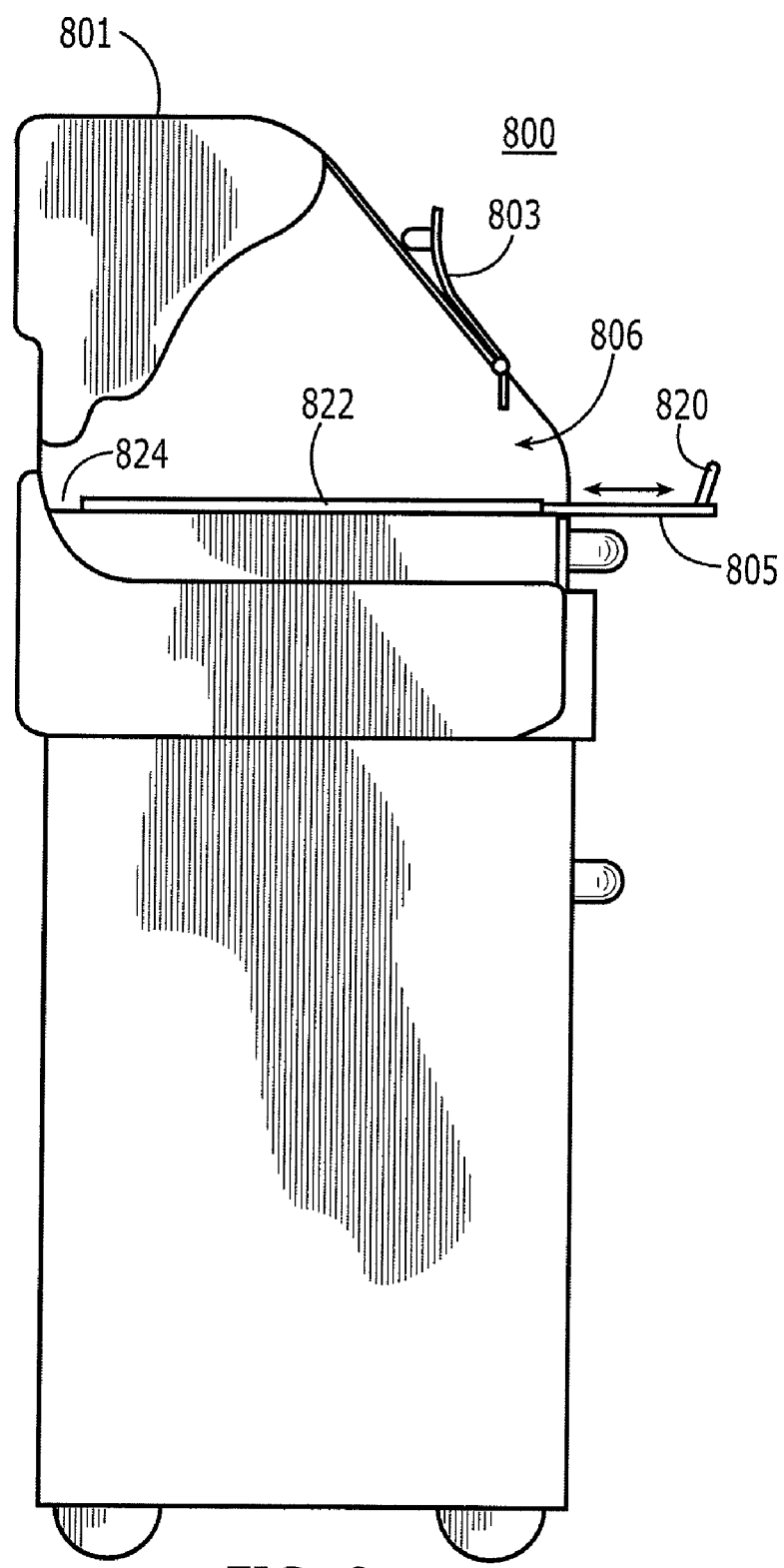
FIG. 9 is a side view of the cooking grill of FIG. 8 with the door in the open position and the slidable grilling module in the open position.
Figure 10:
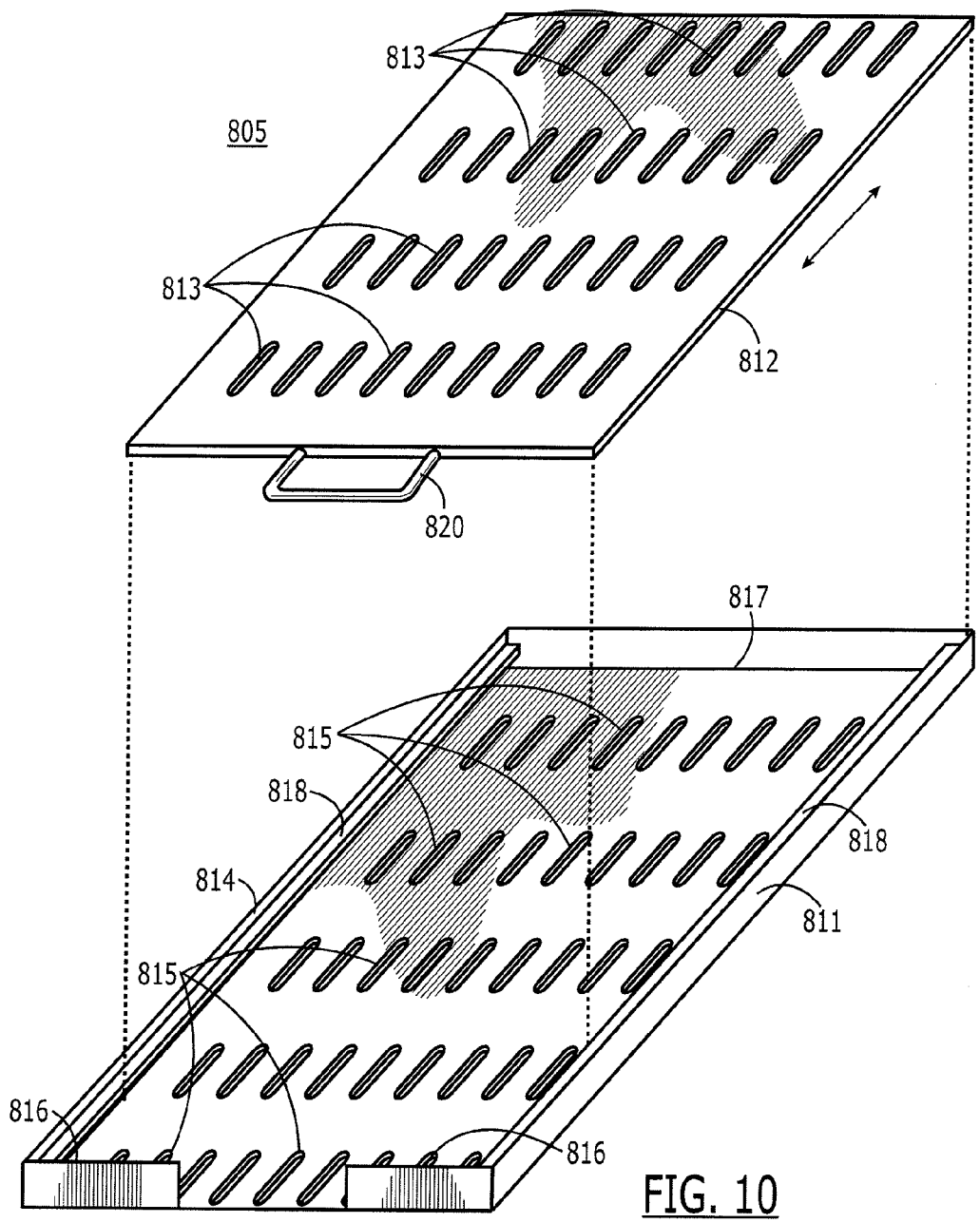
FIG. 10 is a perspective view of an exemplary grilling module.

FIGS. 8-10 illustrate a different embodiment of the cooking grill having several advantageous revised or new features. This embodiment is particularly suitable for use in retrofitting existing grills. Specifically, in accordance with this embodiment, the cover portion or top half of the housing of a conventional grill can be replaced with a cover portion in accordance with the principles of the present invention without retrofitting the base of the grill.

In accordance with the embodiment of FIGS. 8-10, the cover 801 (or top half of the housing) of the grill 800 includes a hinged door 803 on the front surface of the cover 801. In FIG. 8, the grill is shown with the door 803 in the open position and the sliding grilling module 805 in the closed, cooking position. In FIG. 9, the grill 800 is shown with the door 803 in the open position and the sliding grilling module 805 in the fully open position, in which it is pulled out of the cooking chamber 806 through the door 803. One of the advantages of this embodiment is that the slidable grilling module 805 of the grill 800 is entirely above the flame manifolds 806. In the previously described embodiments, the slidable grilling module comprised a drawer within which the flame manifolds floated. While that design is quite practical for a grill initially designed in accordance with the present invention and/or as a retrofit for certain types of conventional grills, it can require a major retrofit for certain other types of conventional grills. Particularly, for certain types of conventional grills, retrofitting the grill to add a drawer that surrounds the flame manifolds, and, therefore is partially above the flame manifolds (e.g., the cooking surface and top of the drawer) and partially below the flame manifolds (e.g., the drip pan and bottom of the drawer) may require modifications to the bottom half 802 of the housing of the grill as well as the cover 801 of the grill.

The embodiment of FIGS. 8-9 provides a design in which the portion of the grill that slides out of the cooking chamber 806 is entirely above the flame manifolds and, therefore, can be entirely embodied within the top half of the housing, requiring no modifications to the main body or bottom portion of the housing of a conventional grill.

FIG. 10 is an exploded view of an exemplary grilling module that may be used as the grilling module 805 in FIGS. 8 and 9. The grilling module 805 comprises two generally flat sheets 811 and 812. The upper sheet 812 serves as the cooking surface upon which food will be placed for cooking. Both sheets 811, 812 preferably include openings 813 and 815, respectively, to permit heat and flame from the flame manifolds beneath the grilling module to pass through and cook food that is placed on top of the module 805. The top sheet 812 includes a handle 820 extending from its front edge. The top sheet 812 is about 2 inches shorter from front to back than the bottom sheet 811 and sits on raised side ledges 818 formed around the periphery of the bottom sheet 812 above the major surface 815 of the lower sheet. A lip 816 at the front of the lower sheet 811 acts as a stop to prevent the upper sheet 812 from being pulled horizontally past the front lip 816. A rear lip 817 in the lower sheet 811 serves a similar stopping function of preventing the upper sheet 812 from being pushed back past the rear lip 817. The upper sheet 812 can be removed only by lifting it up above the lips 816, 817. The upper sheet 812 can therefore slide backwards and forwards on the side ledges 818 about two inches. Furthermore, the lips 816, 817 restrain the upper sheet to always be entirely above the lower sheet so that any drippings from the upper sheet fall onto the lower sheet regardless of where between the two lips the upper sheet is positioned. The entire grilling module 805 sits in the grill above the flame manifolds (not seen in FIG. 10).

Referring again to FIGS. 8 and 9, the cover assembly 801 includes two U channels 822 positioned on opposite lateral sides of the cover 801 within which the grilling module 805, including the upper and lower sheets 811, 812, may slide backwards and forwards. Particularly, the side edges of the upper and lower grilling modules sit in the U channels 822. The U channels 822 preferably are closed in the back so that the grilling module 805 cannot be slid out of the back of the channel. In a preferred embodiment, the U channels are closed so that the grilling module 805, in the fully closed position, leaves a gap 824, preferably at least ½ inch and more preferably about a 1 inch, between the grilling module 805 and the back of the cooking chamber 806 through which a significant portion of the heat from the flame manifolds below the grilling module 805 can rise into the space of the cooking chamber 806 above the grilling module 805 to heat and cook the food by convection. However, the fronts of the U channels 822 are open so that the grilling module 805 can be slid forward out of the cooking chamber 806, as seen in FIG. 9, for instance. Also, if and when desired, the entire grilling module 805 can be slid out and detached from the grill.

The openings 813, 814 in the two sheets are designed and positioned so that, when the upper sheet 812 is pushed as far back as possible against the rear lip 817 relative to the lower sheet 811, the openings 814 in the lower sheet align with the openings 813 in the upper sheet, thus permitting the maximum amount of flame and heat to pass through the grilling module 805 to the food on the surface of the upper sheet 812. However, when the upper sheet 812 is pulled as forward as possible relative to the lower sheet 811 (i.e., against front lip 816, the openings 813 in the upper sheet 811 and the openings 814 in the lower sheet 811 do not overlap at all. Thus, when in this latter position, the minimum amount of heat and flame from the flame manifolds passes through the grilling module 805 to the food. Of course, however a substantial amount of heat still enters the cooking chamber 806 above the grilling module 805 through the aforementioned 1 inch gap 824 between the grilling module 805 and the back of the cover 801. Also, of course, some heat still is conducted through the metal of the sheets 811, 812 as well as through the air in the cooking chamber 806 to the cooking chamber above the grilling module 805 via openings 813 and 814 even when the openings 813, 814 do not overlap at all.

However, when the upper sheet 812 is all the way forward so that the openings 813, 814 do not overlap at all, drippings from the food that fall through the openings 813 in the upper sheet 812 onto the solid portions of the lower sheet 811 rather than through the openings in the lower sheet. This will prevent food drippings from falling on the ground and on people's feet when the grilling module 805 is pulled out of the open doorway in the cover. Thus, this design maintains the benefit of protecting the ground and people's feet from drippings without the need for a sliding drip pan beneath the flame manifolds, as in the other embodiments. Either or both of the sheets 811, 812 may be corrugated or otherwise non-planar such as illustrated in any of the embodiments of FIGS. 5-7. In such cases, the openings 814 in at least the bottom sheet 812 may be positioned slightly above the bottoms of the channels in the sheet so that the channels can trap the drippings without the drippings falling through the openings in the bottom corrugated sheet, as discussed above in connection with FIG. 7.

As an added benefit, the upper sheet 812 can be slid partially anywhere between the full rearward position and the full forward position relative to the lower sheet 811 to vary the alignment of the openings 813, 814 in the upper and lower sheets in order provide additional heat control for cooking.

In an exemplary operation, the chef may start with the upper sheet 812 pushed all the way rearward relative to the lower sheet 811 and with the grilling module 805 pushed fully rearward into the cooking chamber 806 and with the hinged door 803 closed so as to provide maximum heating of the food for cooking. In this position, heat and flames rise into the cooking chamber above the food through the aforementioned 1 inch gap in the back of the cooking chamber as well as through the openings 813, 814 in the sheets 811, 812. If and when desired, the cook may raise the entire cover in a conventional manner (as shown in FIG. 14) or open the hinged door 803 only (as shown in FIGS. 8 and 9) and grasp the handle 820 to pull the upper sheet 812 forward relative to the lower sheet 811 to misalign the openings in the upper sheet and the openings in the lower sheet in order to reduce the amount of heat above the grilling module in the cooking chamber.

Furthermore, when the cook wishes to pull the food out of the cooking chamber to remove and/or observe the food, then the cook grasps the handle 820 (preferably with a glove to avoid getting burned) and pulls the upper sheet 812 forward until it hits the front lip 816 of the lower sheet 811. As the cook continues to pull on the handle 820, the entire grilling module 805, including the upper and lower sheets 811, 812 will slide forward in the U channels 822 and out of the cooking chamber 806 to the position shown in FIG. 9, for instance. Since the upper sheet 812 is now in the full forward position relative to the lower sheet 811, the openings in the upper and lower sheets will not overlap at all. Hence, no drippings from the food will drip through the lower sheet and onto the ground or the cook's feet.

Even further, with only the hinged door 803 open, little heat will escape from the cooking chamber 806, thus substantially maintaining the temperature in the cooking chamber, as previously described in connection with the previous embodiments.

Also, a substantial portion of the heat in the cooking chamber above the grilling module rises above the grilling module through the afore-described gap 824 between the grilling module 805 and the cover 801 at the rear of the cooking chamber 806. This heat will rise through that gap 824 and follow the curvature of the surface of the cover 801 and, therefore, be traveling in a generally downward direction near the front of the cover, as illustrated by the arrows in FIG. 9. Thus, the gap 824 even further enhances the heat retention of the grill.

A small, substantially vertical flange 826, as can be seen in FIG. 8, may be positioned on the inside of the cover 801 just above the door 803 to even further help direct the heat in a downward direction near the door 803 so that it will not escape through the open doorway.

Figure 11:
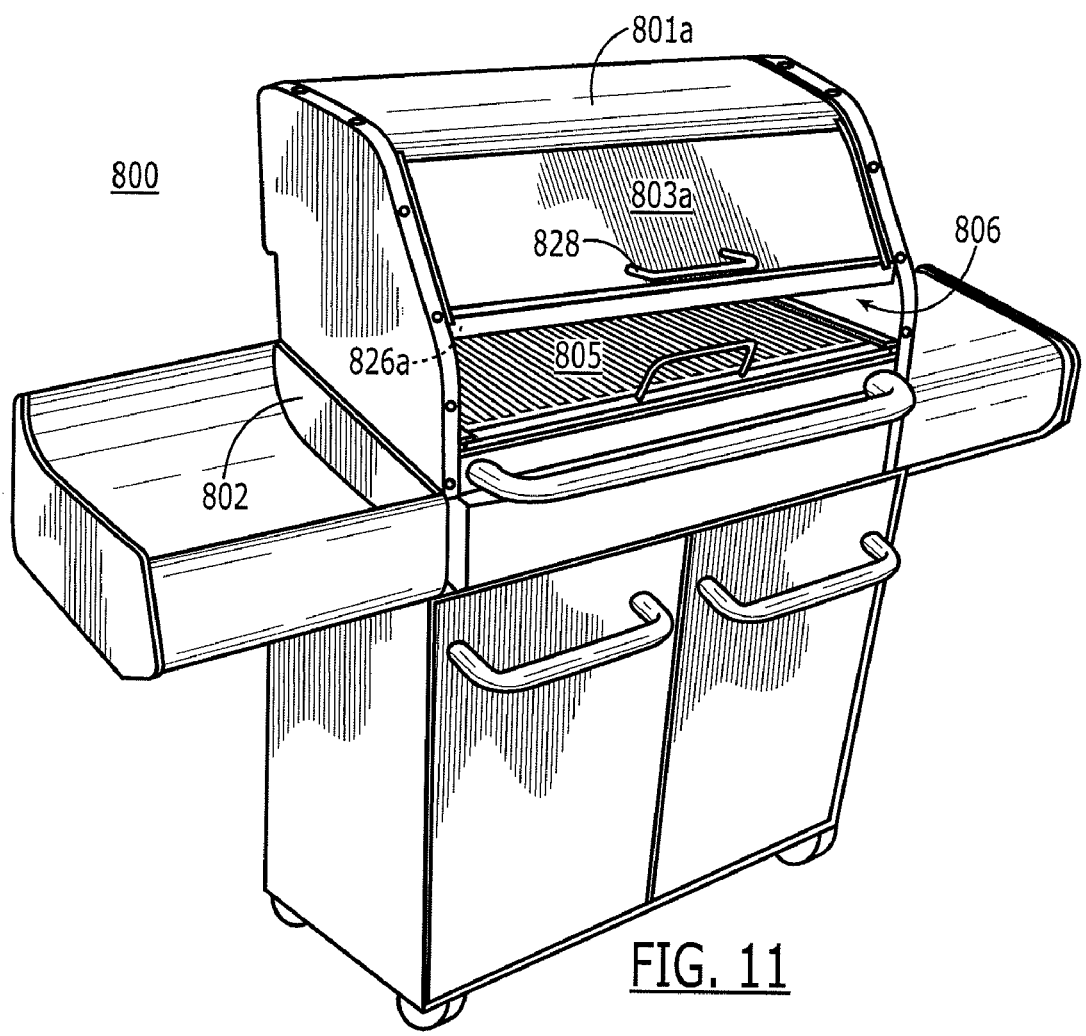
FIG. 11 is a perspective view of an exemplary grill in accordance with another embodiment.

FIG. 11 illustrates an alternative embodiment of the door. In this embodiment, rather than being hinged, the door 803a is a pocket door that slides along rails 821 on the cover 801a. In such an embodiment, heat retention flange still may be positioned inside the cooking chamber on the cover main body 801a just above the top side of the door opening. However, alternately, a heat retention flange 826a may be positioned on the bottom of the door itself as shown in FIG. 11. The door 803a, whether it is hinged or sliding, may have a handle 828 to facilitate its operation by the cook.

In yet another embodiment of the invention, the grilling module may comprise a single sheet rather than upper and lower sheets. The front half of the sheet may be solid and the back half may have openings. Meat, fish, and the like preferentially is cooked on the grated back half of the sheet, while vegetables and the like preferentially are cooked on the solid front half. In this embodiment, the slidable grilling module may be designed so that the single sheet can slide only half way out of the cooking chamber so that only the solid front half of the sheet sticks out. No drippings will fall to the ground since the front half of the sheet is solid and the openings in the back half of the sheet are still within the cooking chamber. In such an embodiment, the cook would have to reach only halfway in with tongs or the like to grasp the food cooking on the back half of the grilling module.

Figure 12:
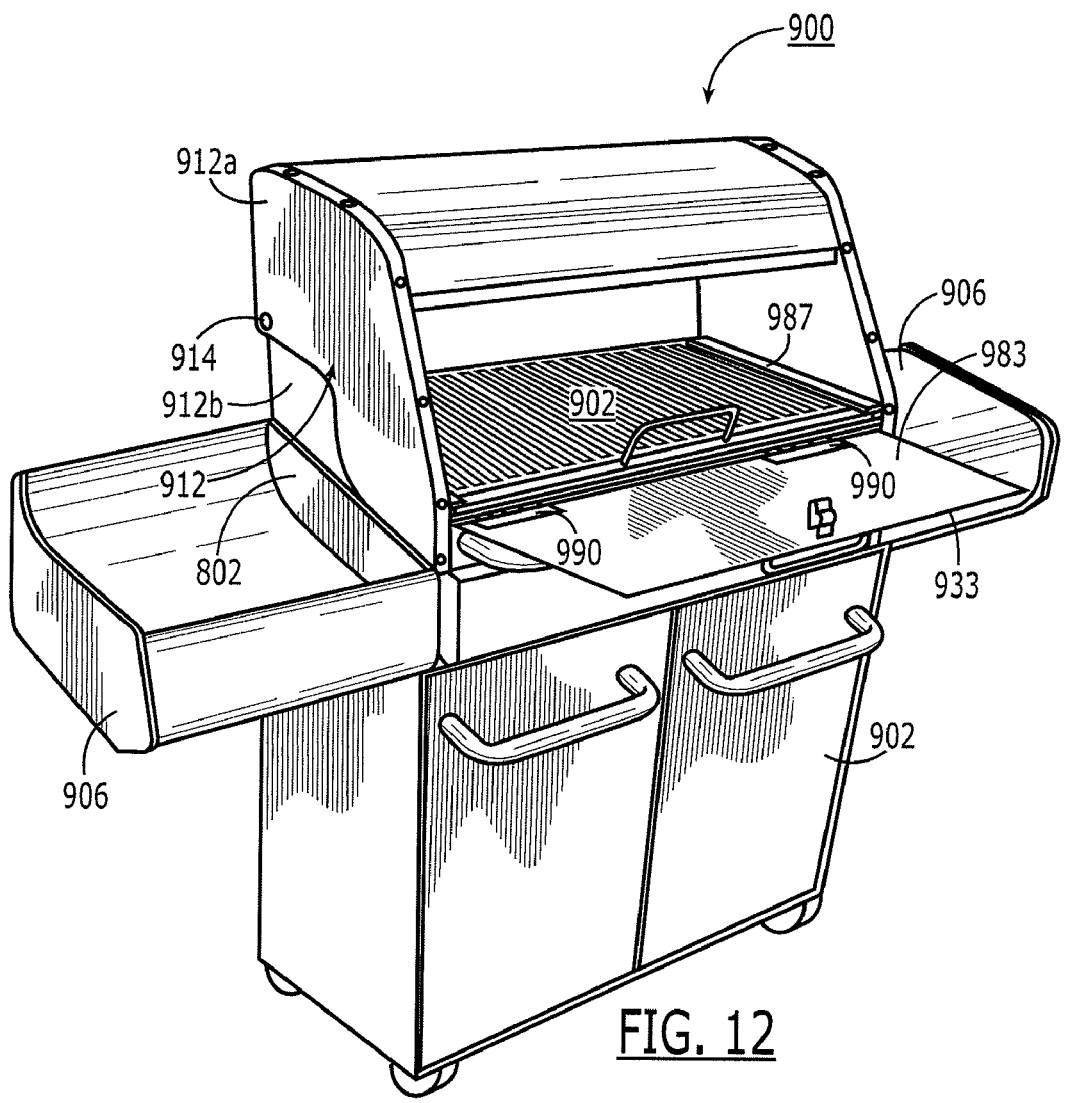
FIG. 12 is a perspective view of a cooking grill in accordance with yet another embodiment with the door in the open position and the grilling surface in the pulled-out, open position.
Figure 13:
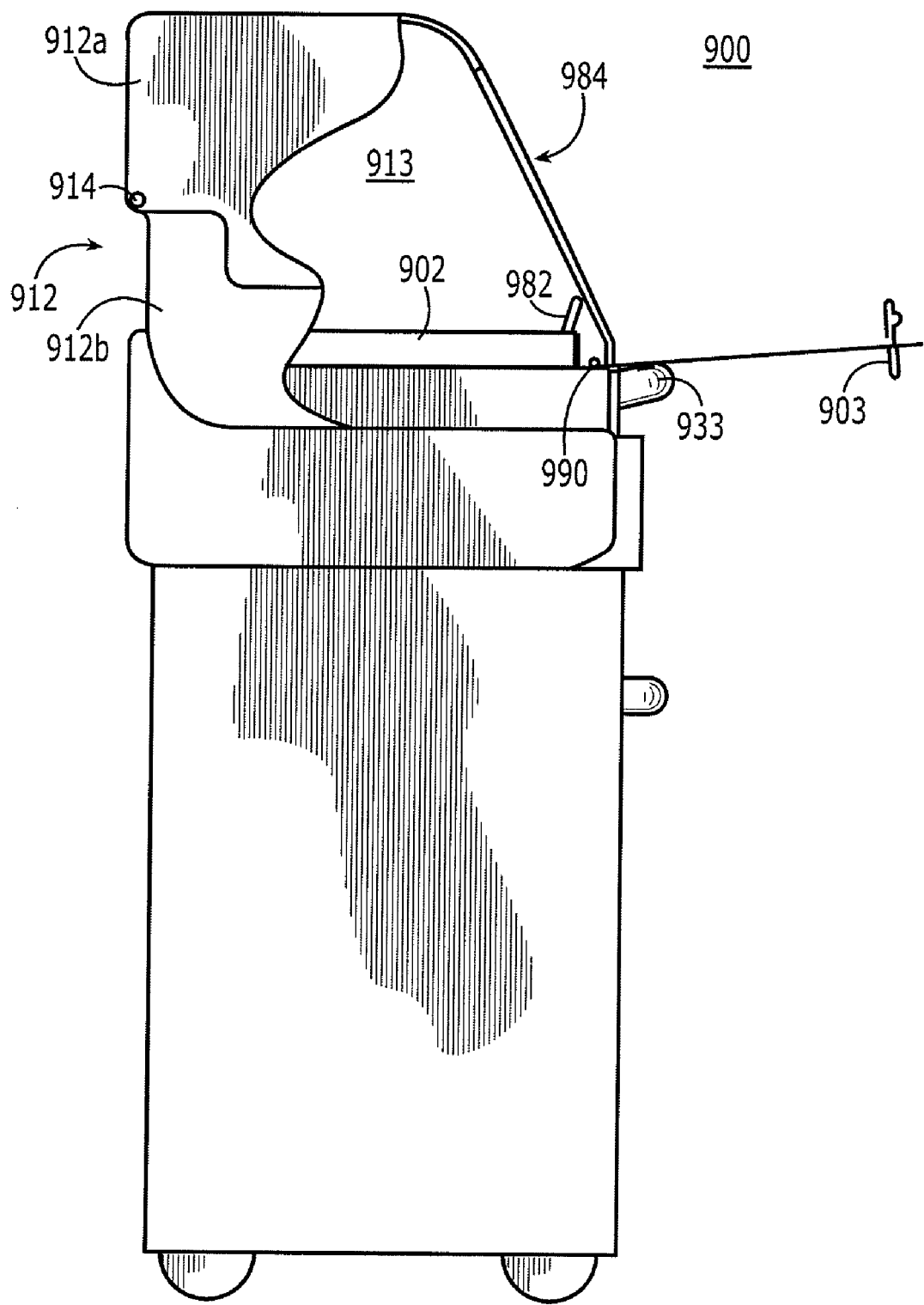
FIG. 13 is a side view of the grill of FIG. 12 with the door open and the cooking surface in the cooking position.

FIGS. 12 and 13 illustrate yet another embodiment of the invention. The grill 900 may be largely similar to the grill embodiments 100 and 800 and contain any combination of the various features described hereinabove in connection with those embodiments, unless otherwise noted hereinbelow. In the embodiment of FIGS. 12 and 13, like the embodiment of FIGS. 8 and 9, rather than having an entire drawer that pulls out bearing a drip pan and the grilling surface, only the grilling surface pulls out. More particularly, the grill 900 comprises a base or stand portion 902 and one or more shelves 906. A cooking chamber 913 is defined by a housing 912 that completely encloses the cooking chamber 913, including flame manifolds (not seen) and a grilling surface such as conventional grating 902.

The cooking chamber is defined by two primary housing portions, including a bottom housing portion 912a and a top housing portion 912b connected to each other by a hinge 914 at the back of the housing 912 so that the top half 912b of the housing may be swung open in a conventional manner, such as by grasping handle 933 extending from the front of the top housing portion 912b. Further, a door 983 is disposed in a substantially vertically oriented opening 984 on the front side surface of the upper portion 912b of the housing that is movable between a closed position in which the door 983 covers the opening 984 and the open position shown in FIGS. 12 and 13. The door has one or more hinges 990 at the bottom and a handle or knob 903 at its top. Also, a latch 985 may be provided near the top edge of the door to latch it to the upper housing portion 912b when in the closed position. The door 983 and opening 984 comprise at least a portion of the front surface of the top housing portion 912b. By grasping the handle 903, a user can open the door 983 downwardly into the position shown in FIG. 12 to expose the cooking chamber 913, but substantially continue the convective cooking of the food because the chamber 913 is still substantially enclosed, and particularly still has a surface above the cooking surface that prevents the hot air from exiting the cooking chamber 913 in the primary direction in which the hot air tends to move, i.e., upwardly. Little of the hot air in the cooking chamber within the housing will escape through the opening because the opening is oriented substantially vertically and displaced horizontally from the main source of the heat. The grilling surface 902 is disposed on horizontal rails 987 so that it can slide in and out of the door opening. Furthermore, the grilling surface 902 may have a handle 982 disposed at its front end to facilitate grasping by tongs or a gloved hand to pull it out along the rails. When pulled out, as shown in FIG. 12, the grilling surface 902 is out of the cooking chamber 913, but the cooking chamber remains substantially enclosed so that little heat is lost. The door 983 itself serves as a drip pan for any drippings that drip from the grilling surface 902 when the grilling surface is pulled out. In one embodiment, stops can be provided so that, in the fully open position, the door is not fully horizontal but has a slight angle, e.g., 1-5 degrees, sloping downwardly from front to back such that drippings that fall onto the door will tend to slide back into the housing. Preferably also, the hinge(s) 990 is positioned within the housing so that, if any drippings fall through any gaps or openings in the hinge(s), they will fall into the cooking chamber.

As seen in FIG. 12, the grill cover, i.e., the upper portion 912b of the housing, may be equipped with a handle 933 to facilitate conventional lifting of the top half of the housing. This handle 933 can also be precisely positioned to serve the secondary function of acting as a stop for the door 983 defining the open position of the door, and specifically stopping the downward rotation of the door into the open position at the aforementioned slight angle to horizontal.

As in the other embodiments, with the grilling surface 902 in this position, the user can see the food, turn the food over, or otherwise manipulate the food without allowing all of the heat in the cooking chamber to escape. When the user is done manipulating the food, he can simply slide the grilling surface 902 back into the housing 912 and close the door 983. When the door is closed, any drippings that remain on the door will now mostly slide down the door into the bottom of the cooking chamber and/or will burn away inside the cooking chamber 913. As is conventional for cooking grills, the bottom of the cooking chamber may have a hole in it with a drip can disposed beneath it. However, in other embodiments, there need be no hole and the drippings can simply stay on the bottom of the housing until cleaned out.

The grill 900 still can be fully opened in a conventional manner by swinging the entire upper half 912b of the housing 912 about its hinge or hinges 914 using handle 933.

The embodiment of FIGS. 12 and 13 has several advantages. For instance, virtually any cooking grill can be adapted in accordance with the principles of this embodiment by simply replacing the top half of the housing with a top housing half such as cover 912a in accordance with the principles of this embodiment. The bottom half of the housing need not be replaced (although slide rails may need to be mounted on the bottom housing half to permit the grilling module to slide in and out of the opening in the top housing half). Furthermore, it is a simple design in that only the grilling surface 902 is slidable in and out of the housing 912. Thus, no modifications to the heating manifolds are necessary and no slidable drip pan needs to be incorporated with the grill to slide with it.

Multiple drawers, grilling modules, or cooking surfaces may be stacked vertically within the housing of a grill in accordance with the principles of any of the embodiments described herein to increase available cooking surface. Each such drawer, module, or cooking surface may be individually slidable in and out of the housing as described hereinabove.

In order to better retain the heat within the cooking chamber in any of the embodiments, the cooking chamber may be shaped with radiused corners, as shown in most of the figures, to avoid sharp corners. Radiused corners will better allow the air circulation in the cooking chamber to flow and circulate smoothly, rather than turbulently, and in the pattern illustrated by the arrows in the drawings.

Additional advantages of the present invention include enhanced safety, convenience, and comfort. Specifically, the user of the grill need not reach directly over the flames in order to manipulate or view the food as he would if using a conventional grill, which, at a minimum, can be rather uncomfortable since the user would be placing his or her hand, face, or other body part directly into the heated air that is rising above the grill. With the present invention, the user can instead remove the food from the heated cooking area laterally to view and manipulate it, while maintaining the cooking volume substantially enclosed so as not to allow the heat to escape. Furthermore, the user may safely remove food from any flame-ups caused by flammable drippings that land on the flame manifolds and/or heat radiators above the flame manifolds and ignite into a fire without the need to open up the entire cover. Such flame ups remain contained within the substantially enclosed housing to die out without exposing them by lifting the cover and potentially leading to a dangerous conflagration.

The principles of the present invention may be incorporated into grills using any fuel source, such as self-contained gasses, external gas supplies, wood, coal, and infrared.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A cooking grill comprising:
   (a) a housing defining a cooking chamber and having a substantially vertically-oriented opening therein;
   (b) a heating element disposed in the cooking chamber;
   (c) a cooking surface configured to slide in and out of the housing in a substantially horizontal manner through the substantially vertically-oriented opening; and
   (d) a door hingedly coupled to the cooking chamber that is configured to transition between a closed position in which the door covers the substantially vertically-oriented opening and an open position in which the cooking surface may pass through the opening;
   (e) wherein the grill is configured to support the door in the open position, and, when the door is supported in the open position, the door is disposed below the substantially vertically-oriented opening such that, when the cooking surface is slid out of the housing through the substantially vertically-oriented opening, the door functions to catch drippings from the grill surface, the door being sized and dimensioned to function to catch drippings from the grill surface; and
   (f) further comprising a grilling module slidable disposed to slide in and out of the housing substantially horizontally through the opening, the grilling module comprising:
   (i) a first sheet having a plurality of first openings, the first sheet comprising the cooking surface;
   (ii) a second sheet having a plurality of second openings;
   (iii) a support structure for holding the first sheet and second sheet substantially parallel to each other with the first sheet above the second sheet, the first sheet being movable relative to the second sheet along a first, substantially horizontal axis substantially parallel to the first and second sheets between,
      (A) a first position in which the first and second openings substantially align with each other along a second, substantially vertical axis perpendicular to the first and second sheets, and
      (B) a second position in which the first openings do not align with the second openings along the second axis.

2. The cooking grill of claim 1 wherein the housing comprises a first housing portion and a second housing portion and a hinge connecting the first and second housing portions such that the second housing portion can be rotated upwardly about the hinge to open the housing to provide access to the cooking chamber, and wherein the opening is entirely in the second housing portion.

3. The cooking grill of claim 1, wherein the grill is configured such that, when the door is supported in the open position, the door is angled upwardly away from the housing so that drippings that fall onto the door will tend to slide down the door toward the housing.

4. The cooking grill of claim 2 further comprising a handle on the second housing portion to facilitate the upward rotation of the second housing portion, and further wherein the handle is below the opening and the door and serves as a stop for the door defining the open position of the door wherein, in the open position, the door is angled upwardly away from the housing so that drippings that fall onto the door will tend to slide down the door toward the housing.

5. The cooking grill of claim 1 wherein the door is coupled to the housing by a hinge, wherein the hinge is within the housing.

6. The cooking grill of claim 1 further comprising a baffle positioned inside the housing above the opening.

7. The cooking grill of claim 6 wherein the baffle is configured to direct heated air circulating within the housing away from the opening.

8. The cooking grill of claim 1 wherein the first sheet is shorter than the second sheet along the first axis.

9. The cooking grill of claim 1 wherein the first axis is substantially perpendicular to the opening in the housing.

10. The cooking grill of claim 9 wherein the support structure comprises first and second stops for limiting the movement of the first sheet relative to the second sheet along the first axis, the first stop defining the first position of the first sheet and the second stop defining the second position of the first sheet.

11. The cooking grill of claim 10 wherein the first and second stops are configured so that the first sheet is restrained to always be above the second sheet in its entirety.

12. The cooking grill of claim 10 wherein the first stop limits the movement of the first sheet relative to the second sheet in a first direction along the first axis directed into the housing from the opening and the second stop limits the movement of the first sheet relative to the second sheet in a second direction along the first axis directed out of the housing from the opening.

13. The cooking grill of claim 12 further comprising a handle on the first sheet disposed adjacent an end of the first sheet in the second direction, wherein pulling on the handle in the second direction moves the first sheet into the second position, and, when the first sheet meets the second stop, continued pulling on the handle will draw the grilling module out of the housing through the opening, and wherein pushing on the handle in the first direction moves the first sheet into the first position, and, when the first sheet meets the first stop, continued pushing on the handle will push the grilling module into the housing through the opening.

14. The cooking grill of claim 1 wherein at least the second sheet is corrugated defining a series of troughs and peaks in the sheet, and wherein the second openings are formed other than at bottoms of the troughs.

15. The cooking grill of claim 1 further comprising a third stop disposed to limit movement of the grilling module in a first direction along the first axis directed into the housing from the opening so as to provide a substantially horizontal gap of at least about ½ inch between the grilling module and an inner surface of the housing opposite the opening in the housing through which heat produced from the flame manifolds may circulate above the grilling module.

16. The cooking grill of claim 1 comprising a plurality of slidable cooking surfaces stacked vertically.

17. The cooking grill of claim 1, wherein the cooking surface comprises a first portion closer to the opening in the housing and a second portion farther from the opening in the housing, the first portion being solid and the second portion comprising openings, the cooking grill further comprising: a stop for limiting the sliding of the cooking surface out of the housing through the opening so that only the first portion of the cooking surface can slide out of the housing through the opening.

18. A cooking grill comprising:
(a) a housing defining a cooking chamber, the housing comprising a curved cover that has a substantially vertically-oriented opening therein;
(b) a heating element disposed in the cooking chamber;
(c) a cooking surface slidably received within channels of the grill housing and disposed above the heating element, the grilling module and channels being configured for substantially horizontal sliding of the cooking surface out of the grill housing through the substantially vertically-oriented opening; and
(d) a door hingedly coupled to the cooking chamber configured to transition between a closed position in which the door covers the substantially vertically-oriented opening and an open position in which the cooking surface may pass through the opening, wherein when the door is in the open position, the door is supported in a horizontal orientation by the grill;
(e) wherein the channels of the grill housing are positioned and configured such that, when the cooking surface is fully received within the grill housing against a back of the channels, a gap is defined between the cooking surface and a back of the grill housing that is sized and dimensioned to allow heat to rise above the cooking surface through the gap, follow the curvature of a surface of the curved cover, and travel in a generally downward direction near the front of the cover; and
(f) further comprising a grilling module slidably disposed to slide in and out of the housing substantially horizontally through the opening, the grilling module comprising:
  (i) a first sheet having a plurality of first openings, the first sheet comprising the cooking surface;
  (ii) a second sheet having a plurality of second openings;
  (iii) a support structure for holding the first sheet and second sheet substantially parallel to each other with the first sheet above the second sheet, the first sheet being movable relative to the second sheet along a first, substantially horizontal axis substantially parallel to the first and second sheets between,
    (A) a first position in which the first and second openings substantially align with each other along a second, substantially vertical axis perpendicular to the first and second sheets, and
    (B) a second position in which the first openings do not align with the second openings along the second axis.

19. A cooking grill comprising:
(a) a housing defining a cooking chamber, the housing comprising a curved cover that has a substantially vertically-oriented opening therein;
(b) a heating element disposed in the cooking chamber;
(c) a cooking surface slidably received within channels of the grill housing and disposed above the heating element, the grilling module and channels being configured for substantially horizontal sliding of the cooking surface out of the grill housing through the substantially vertically-oriented opening; and
(d) a door hingedly coupled to the cooking chamber configured to transition between a closed position in which the door covers the substantially vertically-oriented opening and an open position in which the cooking surface may pass through the opening;
(e) wherein the channels of the grill housing are positioned and configured such that, when the cooking surface is fully received within the grill housing against a back of the channels, a gap is defined between the cooking surface and a back of the grill housing that is sized and dimensioned to allow heat to rise above the cooking surface through the gap, follow the curvature of a surface of the curved cover, and travel in a generally downward direction near the front of the cover; and
(f) wherein the grill is configured to support the door in the open position, and, when the door is supported in the open position, the door is disposed below the substantially vertically-oriented opening such that, when the cooking surface is slid out of the housing through the substantially vertically-oriented opening, the door functions to catch drippings from the grill surface, the door being sized and dimensioned to function to catch drippings from the grill surface; and
(g) further comprising a grilling module slidably disposed to slide in and out of the housing substantially horizontally through the opening, the grilling module comprising:
(i) a first sheet having a plurality of first openings, the first sheet comprising the cooking surface;
(ii) a second sheet having a plurality of second openings;
(iii) a support structure for holding the first sheet and second sheet substantially parallel to each other with the first sheet above the second sheet, the first sheet being movable relative to the second sheet along a first, substantially horizontal axis substantially parallel to the first and second sheets between,
(A) a first position in which the first and second openings substantially align with each other along a second, substantially vertical axis perpendicular to the first and second sheets, and
(B) a second position in which the first openings do not align with the second openings along the second axis.

20. The cooking grill of claim 19, wherein the grill is configured such that, when the door is supported in the open position, the door is angled upwardly away from the housing so that drippings that fall onto the door will tend to slide down the door toward the housing.

* * * * *